United States Patent Office 3,351,526
Patented Nov. 7, 1967

3,351,526
PROCESS FOR REDUCING BLOOD COAGULATION TIME BY ADMINISTERING THERAPEUTICALLY ACTIVE DERIVATIVES OF DIHYDROXYBENZENE-SULFONATES
Antonio Esteve Subirana, Barcelona, Spain, assignor to Laboratoires Om Societe Anonyme, Geneva, Switzerland
No Drawing. Original application June 18, 1962, Ser. No. 202,981. Divided and this application Dec. 10, 1963, Ser. No. 329,391
Claims priority, application Switzerland, Jan. 29, 1962, 1,078/62
6 Claims. (Cl. 167—65)

ABSTRACT OF THE DISCLOSURE

Process for reducing blood coagulation time by administering para-dihydroxybenzene sulfonates; for example, diethylammonium para-dihydroxybenzene sulfonate and triethanolammonium para-dihydroxybenzene sulfonate.

This application is a division of application Serial No. 202,981, filed June 18, 1962, the latter of which is a continuation-in-part of application Serial No. 2, filed January 4, 1960, now abandoned.

This invention relates to therapeutically active derivatives of the para-dihydroxybenzene-sulfonates.

Extensive research is now being conducted on products for the coagulation of blood, especially with regard to reducing the time of coagulation and bleeding.

The older organotherapeutical preparations for increasing the normal effects of the coagulation have, to a large part, been replaced by synthetic products, completely independent from the physiological process and which act much more effectively on the coagulation.

It is a discovery of the present invention that certain derivatives of the para-dihydroxybenzene-sulfonates can be administered orally, through the rectum, or in a parenteral manner, and possess the physiological characteristic of reducing the time of coagulation and bleeding at a rate superior to that obtained from products being used up to now.

The products of the invention, as well as their method of preparation, and their pharmacological characteristics have not been previously described. The compounds of the invention are in accordance with the general formula:

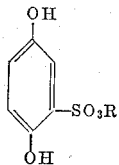

in which the R is an alkylammonium, arylammonium, or alkanolammonium ion.

The activity of these derivatives depends to a great extent on the characteristic of the basic group R in the above formula, so that toxicity, as well as activity, and consequently, the therapeutical index, varies between rather large limits.

Based on the discovery revealed above, the present invention relates to a process for the preparation of therapeutically active derivatives of the para-dihydroxybenzene-sulfonates, corresponding to the preceding general formula.

This process is characterized by the condensation of benzoquinone with a bisulphite of the formula $RHSO_3$ in which R is the same substituent identified above as an alkylammonium, arylammonium, or alkanolammonium ion.

The condensing process is preferably carried out in aqueous-ethyl alcohol medium, but can also be carried out in a medium that is only aqueous, or anhydrous ethyl alcohol. It is possible that during the condensation some compounds may form, such as quinhydrone, that do not possess the desired therapeutical characteristics. By carrying out the condensation as indicated in the following examples, especially at a temperature that does not exceed 10° C., the formation of undesirable compounds can be practically avoided.

The more active products and the least toxic derivatives corresponding to the formula given above are found among derivatives of aliphatic amines, for example, that obtained by the condensation with the bisulfite of diethylamine which is prepared by the action of sulfur dioxide with the amine. This product is produced by the condensation of said bisulphite with the necessary quantity of pure 1,4-benzoquinone.

The biological characteristics of this product are as follows:

The Toxicity, determined by the intravenous on mice, gives: $DL_{50}$ equal to 725 mg./kg.

Antihemorrhagic Activity, determined in accordance with the Roskam method in the ear of a rabbit, gives:

|  | Seconds |
|---|---|
| Average period of normal bleeding (100 test measurements) | 300 |
| Average period of bleeding after the rabbit has been given in intravenous manner 5 mg. of the product per kg. weight of the animal; the results ascertained one hour after injection (100 determinations) | 175 |
| Average period of bleeding under the same conditions, but results determined 6 hours after injection | 234 |

The average period of coagulation determined by the method of calibrated hematolysis tube is reduced approximately by one-half, one hour after intravenous injection of 5 mg. of the product per kg. of the weight of the animal.

With humans the results have also been very favorable as to the local and general tolerance either by intravenous and intramuscular manner.

The clinical action has been studied by determining the period of bleeding and coagulation. The measurements have been made one hour after the injection of 2 cc. of a 10% solution of the pure product. Under these circumstances, the average bleeding time determined on 20 patients decreased from 2 minutes 48 seconds to 2 minutes 3 seconds, representing an average drop of 26.7%. The average coagulation period has been decreased from 4 minutes 51 seconds to 3 minutes 39 seconds representing a reduction of 30%.

The following examples illustrate the process of the present invention for the preparation of the new series of products. It is not intended that the examples should in any way limit the scope of the invention.

Example I.—Diethylammonium para-dihydroxybenzene-sulphonate 163 grams of pure diethylamine bisulphite is added to an ethyl alcohol solution of 108 grams of 1,4-benzoquinone at a temperature not above 5° C. and under continuous stirring. After condensation, the alcohol is removed by distilling under vacuum. The product was recrystallized from ethyl alcohol 80° C. Yield: 198 grams of para-dihydroxybenzene-sulphonate of diethylamine. Melting point 125° C.

Example II.—Triethanolammonium para-dihydroxybenzene-sulphonate 230 grams of triethanolamine bisulphite in ethyl alcohol is added to a solution of 108 grams of 1,4-benzoquinone in trichlorethylene. The addition must be drop by drop and with cooling. The mixture is stirred vigorously for one hour. At the end of the stirring period the upper layer is removed; this is treated under heat with n-butyl alcohol. By cooling the solution, the product is precipitated in the form of a thick liquid at ordinary temperature. Yield: 308 grams of para-dihydroxybenzene-sulphonate of triethanolamine.

Other modes of applying the principle of the invention may be employed, change being made as regards the details described, provided the features stated in any of the following claims or the equivalent of such be employed.

I, therefore, particularly point out and distinctly claim as my invention:

1. The process of reducing blood coagulation time which comprises administering diethylammonium para-dihydroxybenzene sulfonate to the class consisting of animals and humans.
2. The process of reducing blood coagulation time which comprises administering triethanolammonium para-dihydroxybenzene sulfonate to the class consisting of animals and humans.
3. The process of claim 1 in which said sulfonate is administered to an animal.
4. The process of claim 2 in which said sulfonate is administered to an animal.
5. The process of reducing blood coagulation time which comprises administering to humans diethylammonium para-dihydroxybenzene sulfonate.
6. The process of reducing blood coagulation time which comprises administering to humans triethanolammonium para-dihydroxybenzene sulfonate.

References Cited
UNITED STATES PATENTS 2,774,711   12/1956   Fleischhacker _____ 167—65

SAM ROSEN, *Primary Examiner.*